(12) United States Patent
Graham (10) Patent No.: US 9,193,314 B1
(45) Date of Patent: Nov. 24, 2015

(54) EVENT SENSITIVE LEARNING INTERFACE

(71) Applicant: Atieva, Inc., Redwood City, CA (US)

(72) Inventor: Philip R. Graham, Milpitas, CA (US)

(73) Assignee: ATIEVA, INC., Menlo Park, CA (US)

( * ) Notice: Subject to any disclaimer, the term of this patent is extended or adjusted under 35 U.S.C. 154(b) by 4 days.

(21) Appl. No.: 14/299,962

(22) Filed: Jun. 9, 2014

Related U.S. Application Data (63) Continuation-in-part of application No. 14/298,998, filed on Jun. 9, 2014.

(51) Int. Cl.
*B60R 16/037* (2006.01)
*B60W 40/09* (2012.01)
*G08B 21/06* (2006.01)
*B60W 40/08* (2012.01)

(52) U.S. Cl.
CPC .............. *B60R 16/037* (2013.01); *B60W 40/09* (2013.01); *B60W 2040/0827* (2013.01); *G08B 21/06* (2013.01)

(58) Field of Classification Search
CPC ............ B60W 40/09; B60W 2040/0827; B60W 2540/22; B60W 2540/28; G08B 21/06; G08G 1/166; G08G 1/167; A61B 5/0205; A61B 5/0476; A61B 5/055; A61B 5/1103; A61B 5/14553; A61B 5/18; B60K 28/06; B60K 28/066; B60R 16/037; B60T 2201/03; B60T 2201/08; B60T 2201/12; B60T 2220/02; B60T 8/172; B62D 6/007; G01C 21/3697; G06F 17/00; G06Q 10/02; H04L 63/08
USPC ......... 701/23, 37, 41, 445; 703/8; 705/13, 50; 711/103; 340/438, 905; 348/148
See application file for complete search history.

(56) References Cited

U.S. PATENT DOCUMENTS

| | | | | |
|---|---|---|---|---|
| 2006/0173781 | A1* | 8/2006 | Donner | G06Q 10/02 705/50 |
| 2007/0038422 | A1* | 2/2007 | Wang | G06F 17/5095 703/8 |
| 2009/0143936 | A1* | 6/2009 | Craig | B60W 40/02 701/37 |
| 2009/0216935 | A1* | 8/2009 | Flick | B60R 16/037 711/103 |
| 2010/0194552 | A1* | 8/2010 | Jaisimha | B60Q 1/143 340/438 |
| 2010/0225762 | A1* | 9/2010 | Augst | B60R 1/00 348/148 |
| 2012/0212353 | A1* | 8/2012 | Fung | B60K 28/06 340/905 |
| 2013/0226408 | A1* | 8/2013 | Fung | B60W 40/09 701/41 |
| 2013/0325328 | A1* | 12/2013 | Anguelov | G01C 21/32 701/445 |
| 2014/0310075 | A1* | 10/2014 | Ricci | G07C 9/00158 705/13 |
| 2015/0025731 | A1* | 1/2015 | Uehara | G05D 1/00 701/23 |

* cited by examiner

*Primary Examiner* — James Trammell
*Assistant Examiner* — Sanjeev Malhotra
(74) *Attorney, Agent, or Firm* — Patent Law Office of David G. Beck (57) ABSTRACT

A vehicle control system is provided that is able to (i) identify a particular driver from other potential drivers and (ii) monitor various vehicle functions in order to determine if the identified driver repeatedly performs the same behavior upon the occurrence of a particular event or condition. When the control system determines that the identified driver repeats the same behavior upon the re-occurrence of the same event or condition, the controller learns that behavior and associates it with the identified driver so that it can be automatically performed, without driver interaction, when the same event or condition re-occurs.

17 Claims, 5 Drawing Sheets

EVENT SENSITIVE LEARNING INTERFACE

CROSS-REFERENCE TO RELATED APPLICATION

This application is a continuation-in-part of U.S. patent application Ser. No. 14/298,998, filed 9 Jun. 2014, the disclosure of which is incorporated herein by reference for any and all purposes.

FIELD OF THE INVENTION

The present invention relates generally to a vehicle and, more particularly, to a system that automatically adjusts a vehicle's settings based on the needs and desires of each particular driver.

BACKGROUND OF THE INVENTION

Luxury vehicles offer a number of user amenities that provide the driver with a more enriching experience, and one which attempts to cater to each driver and their particular wants and needs. For example, many cars allow the driver to select between multiple driving modes by simply rotating a knob or pushing a button, where each driving mode alters a variety of vehicle characteristics ranging from throttle response to suspension set-up. Commonly used driving modes include normal, economy and sport. Another feature that has become commonplace among luxury vehicles is the ability to preset and memorize the various aspects of the driver's seat, e.g., seat position, seat height, seatback incline, lumbar support, seat cushion angle and seat cushion length. Once preset, recorded in memory and assigned to a particular user, the preset settings may be re-obtained by simply pushing a button within the car or activating the car with a user assigned key fob. Outside mirrors and steering wheel position may also be linked to the same memory, thus allowing the vehicle to automatically adjust the driver's seat, steering wheel and mirror placement once a particular driver is identified.

While automatic seat positioning systems and driver selectable driving modes provide a user-customized vehicle interface, further improvement is desired so that each driver is provided with a unique driving experience that is specifically and automatically tailored to their driving style. The present invention provides a system that is capable of delivering this enhanced driver experience.

SUMMARY OF THE INVENTION

The present invention provides a method of automatically modifying a system setting for a vehicle, the method comprising the steps of (i) identifying a specific driver of the vehicle from a plurality of potential drivers; (ii) monitoring a user-settable function of the vehicle, where the user-settable function preferably corresponds to a vehicle system selected from the group consisting of an audio system, a heating, ventilation and air conditioning (HVAC) system, a vehicle mode selector system, a seat positioning system, a steering wheel positioning system, a light control system, a vehicle suspension positioning system, a navigation system or an auxiliary vehicle system; (iii) detecting an occurrence of the specific driver adjusting the user-settable function to a first setting; (iv) determining an event corresponding to the occurrence of the specific driver adjusting the user-settable function to the first setting, wherein if the specific driver adjusts the user-settable function to the first setting when said event re-occurs and for more than a preset number of times, for example over a period of days, then the method further comprises the step of automatically modifying the user-settable function to the first setting each time the specific driver is identified and the event re-occurs, where the step of automatically modifying the user-settable function is performed without interaction between the specific driver and the user-settable function. The event may correspond to the step of activating the vehicle by the specific driver; alternately, the event may correspond to an ambient environmental condition (e.g., a specific ambient temperature, a specific ambient air quality, a specific ambient sound level, a specific ambient light level, etc.).

In one aspect, the method may include the step of requiring that each time the specific driver is identified and the event re-occurs, the specific driver must adjust the user-settable function to the first setting; if the specific driver does not consistently adjust the user-settable function to the first setting each time the event re-occurs then the step of automatically modifying the user-settable function is at least temporarily suspended.

In another aspect, the method may include the step of requesting driver confirmation prior to performing the step of automatically modifying the user-settable function to the first setting each time the specific driver is identified and the event re-occurs. Preferably, if a positive response to the driver confirmation request is not received, the step of automatically modifying the user-settable function to the first setting each time the specific driver is identified and the event re-occurs is not performed.

In another aspect, the step of automatically modifying the user-settable function to the first setting may further include the steps of (i) recording in memory the first setting and the event, and (ii) associating the first setting and the event with the specific driver. The method may further include the step of requesting driver confirmation prior to performing the steps of recording the first setting and the event in memory, associating the first setting and the event with the specific driver, and automatically modifying the user-settable function to the first setting each time the specific driver is identified and the event re-occurs. Preferably, if a positive response to the driver confirmation request is not received, the steps of recording the first setting and the event in memory, associating the first setting and the event with the specific driver, and automatically modifying the user-settable function to the first setting each time the specific driver is identified and the event re-occurs are not performed.

In another aspect, if the specific driver adjusts the user-settable function from the first setting to a second setting after the user-settable function has been automatically modified to the first setting and during the event, then the step of automatically modifying the user-settable function may be at least temporarily suspended. The suspending step may be performed until the specific driver repeats the step of adjusting the user-settable function to the first setting when the event re-occurs and for more than the preset number of times.

In another aspect, if after the step of automatically modifying the user-settable function to the first setting the specific driver adjusts the user-settable function from the first setting to a second setting within a preset length of time of the event, then the step of automatically modifying the user-settable function is at least temporarily suspended. The suspending step may be performed until the specific driver repeats the step of adjusting the user-settable function to the first setting when the event re-occurs and for more than the preset number of times.

In another aspect, the step of identifying the specific driver of the vehicle may be performed when a remote device is plugged into an on-board port coupled to an on-board system controller, where the remote device is physically separate and independent of the vehicle; alternately, when a remote device within a preset range of the vehicle is detected and a short range link is established between the remote device and an on-board system controller, where the step of identifying the specific driver is performed automatically when the short range link is established between the remote device and the on-board system controller, and where the remote device is physically separate and independent of the vehicle; alternately, using an on-board driver identification system, for example an on-board driver identification system selected from the group consisting of a fingerprint scanner, a face recognition system, a voice recognition system, a weight-based identification system, a voice-controlled user interface, and a touch-controlled user interface.

In another aspect, the step of monitoring the user-settable function may further comprise the step of selecting the user-settable function from a plurality of user-adjustable vehicle functions, where the step of selecting the user-settable function is performed by the specific driver. If the specific driver does not perform the step of selecting the user-settable function from the plurality of user-adjustable vehicle functions, then an on-board system controller may set a default function as the user-settable function.

In another aspect, the method may further comprise the step of determining if the specific driver is a first time driver of the vehicle, wherein if the specific driver is a first time driver of the vehicle then the step of monitoring the user-settable function further comprises the step of selecting the user-settable function from a plurality of user-adjustable vehicle functions, where the step of selecting the user-settable function is performed by the specific driver. If the specific driver does not perform the step of selecting the user-settable function from the plurality of user-adjustable vehicle functions, then an on-board system controller may set a default function as the user-settable function. If the specific driver is not a first time driver of the vehicle then the step of monitoring the user-settable function may further comprise the step of determining if the specific driver pre-selected the user-settable function from the plurality of user-adjustable vehicle functions, wherein an on-board system controller sets a default function as the user-settable function if the specific driver did not pre-select the user-settable function.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure. The terms "electric vehicle" and "EV" may be used interchangeably and refer to an all-electric vehicle.

Figure 1:
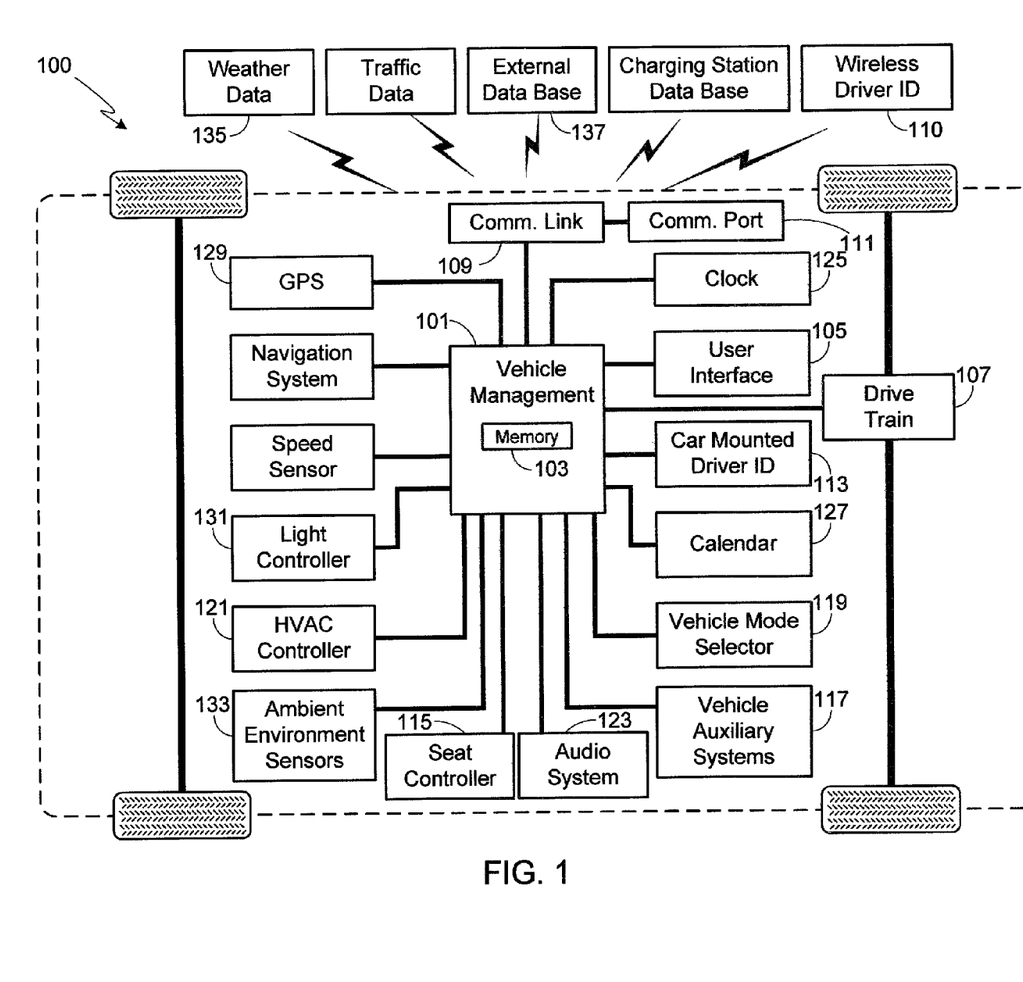
FIG. 1 provides a system level diagram of the primary vehicle systems utilized in at least one embodiment of the invention.

FIG. 1 is a high-level view of a vehicle 100 and the primary systems used in the behavior learning system of the invention. Vehicle 100 may be an electric vehicle (EV), a vehicle utilizing an internal combustion engine (ICE), or a hybrid vehicle, where a hybrid vehicle utilizes multiple sources of propulsion including an electric drive system. Vehicle 100 includes a vehicle system controller 101, also referred to herein as a vehicle management system, which is comprised of a central processing unit (CPU). System controller 101 also includes memory 103, with memory 103 being comprised of EPROM, EEPROM, flash memory, RAM, solid state drive, hard disk drive, or any other type of memory or combination of memory types. A user interface 105 is coupled to vehicle management system 101. Interface 105 allows the driver, or a passenger, to interact with the vehicle management system, for example inputting data into the navigation system, altering the heating, ventilation and air conditioning (HVAC) system, controlling the vehicle's entertainment system (e.g., radio, CD/DVD player, etc.), adjusting vehicle settings (e.g., seat positions, light controls, etc.), and/or otherwise altering the functionality of vehicle 100. In at least some embodiments, interface 105 also includes means for the vehicle management system to provide information to the driver and/or passenger, information such as a navigation map or driving instructions as well as the operating performance of any of a variety of vehicle systems (e.g., battery pack charge level for an EV, fuel level for an ICE-based or hybrid vehicle, selected gear, current entertainment system settings such as volume level and selected track information, external light settings, current vehicle speed, current HVAC settings such as cabin temperature and/or fan settings, etc.). Interface 105 may also be used to warn the driver of a vehicle condition (e.g., low battery charge level or low fuel level) and/or communicate an operating system malfunction (battery system not charging properly, low oil pressure for an ICE-based vehicle, low tire air pressure, etc.). Interface 105 may be comprised of a single interface, for example a touch-screen display, or a combination of user interfaces such as push-button switches, capacitive switches, slide or toggle switches, gauges, display screens, warning lights, audible warning signals, etc. It will be appreciated that if user interface 105 includes a graphical display, controller 101 may also include a graphical processing unit (GPU), with the GPU being either separate from or contained on the same chip set as the CPU.

Vehicle 100 includes a drive train 107 that may be comprised of an internal combustion engine, one or more motors, or a combination of both. The vehicle's drive system may be mechanically coupled to the front axle/wheels, the rear axle/wheels, or both, and may utilize any of a variety of transmission types (e.g., single speed, multi-speed) and differential types (e.g., open, locked, limited slip).

In accordance with the invention, when system controller 101 determines that a particular driver repeatedly performs the same behavior at the same time each day, or the same day of the week, or at the same location, or in response to the same conditions or events, the system controller 'learns' that behavior so that it can be automatically performed when the same conditions arise in the future for the same driver. As described in detail below, this methodology can be used to learn any of a variety of different driver responses, ranging from initial settings when the driver first enters the car to a particular driver's reaction to changing conditions.

Figure 2:
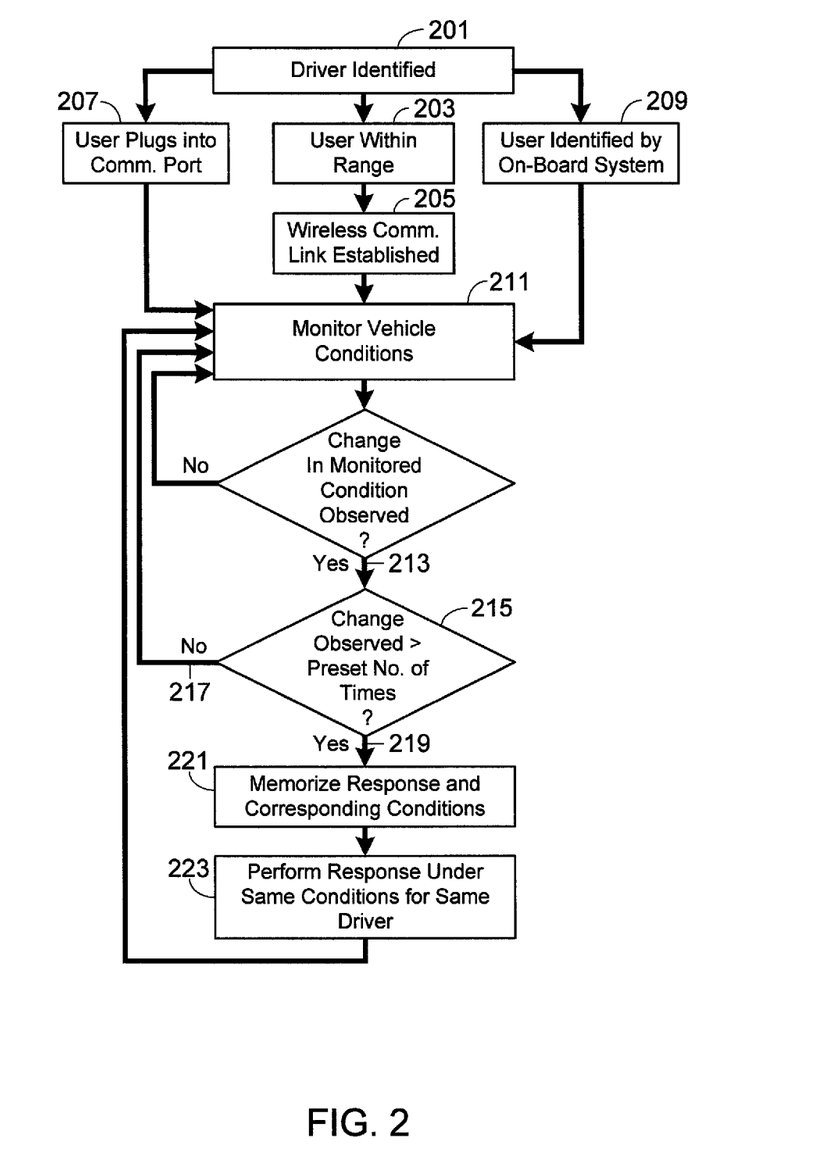
FIG. 2 illustrates the basic methodology of the invention in accordance with a preferred embodiment.

FIG. 2 illustrates the basic methodology of the invention. Initially the driver is identified by vehicle controller 101 (step 201). Driver identification may be obtained in a variety of ways. In at least one embodiment, the system is only configured to allow the driver to be identified using a single technique, while in other embodiments the system is configured to allow the controller to determine the driver's identification using any of a variety of techniques. In one technique, when the user comes into close proximity to the vehicle (step 203), for example by entering and sitting in the vehicle, a short range link is established (step 205) between the vehicle's communication link 109 and a user device 110. User device 110 provides a unique signature for each driver, thereby allowing the driver to be identified. Typical devices 110 include the driver's key fob or a smartphone, although other devices that provide a unique user identifier may also be used to identify the driver. The wireless technology can use a radio-frequency identification (RFID) system, Bluetooth wireless technology, or a similar short range wireless technology. In an alternate technique, when the user plugs their smartphone or other compatible device 110 into an on-board port 111 such as a USB, Thunderbolt or other I/O interface port, the system identifies the user via a unique identifier associated with the plugged-in device (step 207). In an alternate technique, controller 101 is coupled to an on-board driver identification system 113 and uses this system to identify the driver (step 209). On-board driver ID system 113 may use a simple driver selector, such as a series of buttons that identify "Driver 1", "Driver 2", etc. Alternately, ID system 113 may use a fingerprint scanner, similar to the scanner used in some smartphones and laptop computers. Alternately, ID system 113 may use face recognition or voice recognition to identify the driver. Alternately, the driver can identify themselves by entering a command, either via touch or voice, through user interface 105. Alternately, ID system 113 may use weight sensors located in the driver's seat to determine the weight, or perceived weight, of the driver, which is then used by system 113 to identify the driver. Note that if a weight-based ID system is used, once a driver is identified their weight is tracked, thus allowing ID system 113 to continue to track an identified driver as their weight varies with time.

Once system controller 101 has identified the current driver, the system monitors various vehicle functions for any changes in the function's settings (step 211). As discussed below, controller 101 may be configured to monitor any of a variety of vehicle systems, for example the vehicle's audio system, the heating, ventilation and air conditioning (HVAC) system, a vehicle mode selector system, a seat positioning system, a steering wheel positioning system, a light control system (e.g., internal lighting, external lighting), a vehicle suspension positioning system, the vehicle's navigation system, or an auxiliary vehicle system (e.g., garage door controller, charge port door controller, fuel door controller, etc.).

After a change in a monitored vehicle systems is observed (step 213), then the controller determines if the identified driver previously made the same change under the same conditions (step 215). The number of times that a driver must repeat a behavior before it is learned is preset. Typically the value input for this preset number is set by the manufacturer, although in some embodiments it may be preset by the driver, or by the vehicle's owner, or by a third party (e.g., a service technician). In general, the system is configured to only learn behavior when it is clear that the behavior is truly repetitive, while still insuring that the vehicle adapts quickly. Preferably the value used in step 215 is set between two and five. In at least one embodiment, the identified driver must repeat the behavior every time that the conditions are the same in order for the controller to learn the behavior. In other embodiments the controller determines whether the observed behavior has been repeated with a certain frequency, e.g., out of 10 times in which the same conditions were present, the identified driver must perform the same change to the monitored vehicle function at least 8 times in order for the controller to learn the behavior.

If the observed behavior has not been repeated more than the preset value used in step 215 (step 217), then the system returns to simply monitoring vehicle conditions (step 211). If the observed behavior has been repeated more than the preset value used in step 215 (step 219), then the system controller memorizes the observed response as well as the conditions at the time of the response, i.e., time of day, time since vehicle activation, vehicle location, ambient conditions (e.g., ambient temperature, air quality, ambient sound level, ambient light level, etc.), traffic conditions, etc. (step 221). From that point on, when the system identifies that particular driver, the system will automatically perform the observed driver response when the same conditions are observed (step 223).

Figure 3:
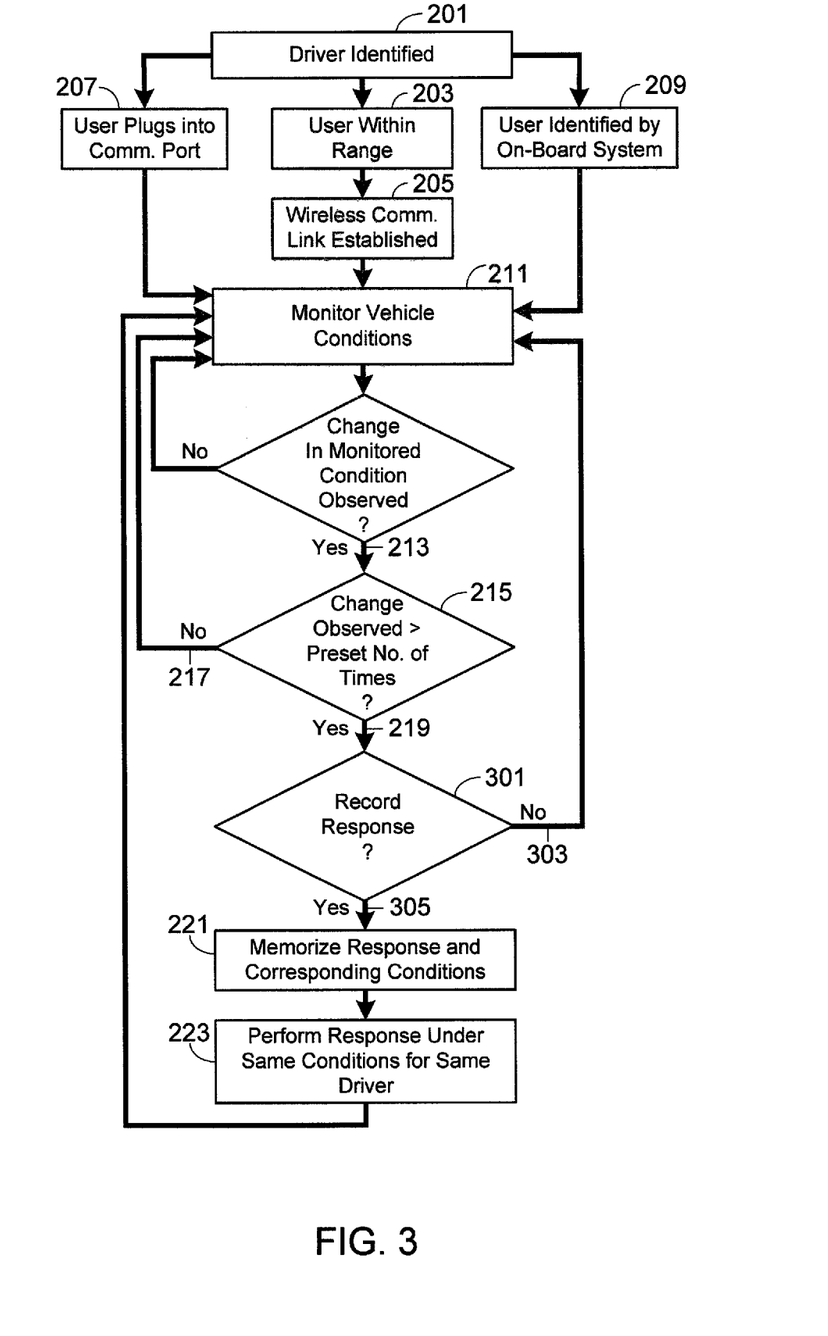
FIG. 3 illustrates a modification of the basic methodology shown in FIG. 2.

FIG. 3 illustrates a slight modification of the methodology shown in FIG. 2. In this process, once an observed behavior for a particular driver has been repeated more than the preset value used in step 215 (step 219), then the system controller requests confirmation that the driver wishes to automatically perform the observed response each time the same conditions arise (step 301). Preferably driver confirmation is requested via user interface 105. If the driver indicates that the observed response should not be memorized and automatically performed in the future (step 303), then the system returns to monitoring vehicle conditions (step 211). If the driver confirms (step 305) that the response should be automatically performed in the future, then the system controller memorizes the observed response as well as the conditions at the time of the response (step 221) and automatically performs the observed driver response when the same conditions are observed (step 223).

Figure 4:
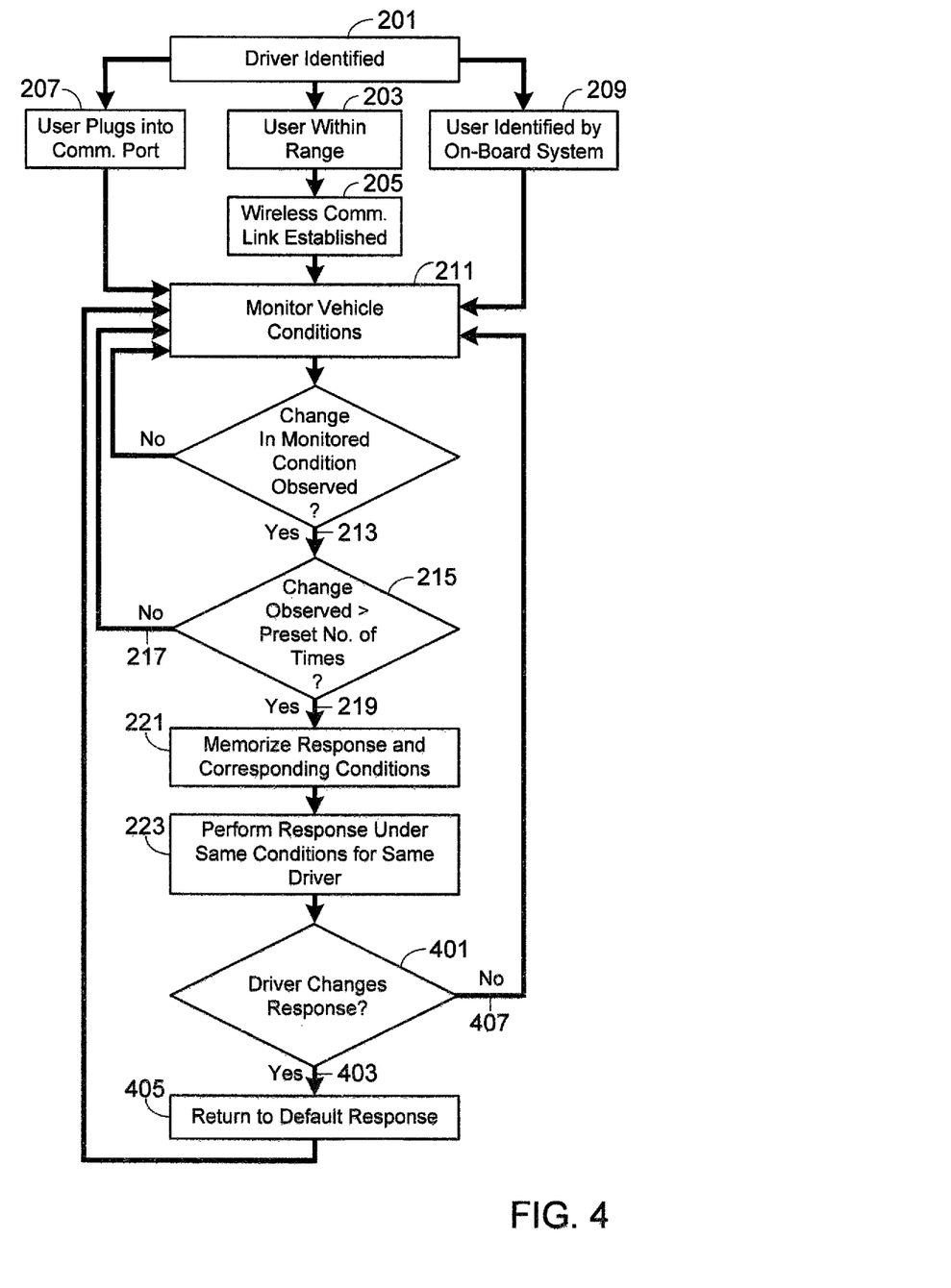
FIG. 4 illustrates another modification of the basic methodology shown in FIG. 2.

FIG. 4 illustrates another modification of the basic methodology shown in FIG. 2 that provides the driver with an easy way of over-riding the automatic response. Because this approach provides an over-ride feature (step 401), it is expected that it would be used in an embodiment that does not include driver confirmation step 301, although it could be used with an embodiment such as that shown in FIG. 3, thus providing the driver both with a confirmation step (step 301) and an over-ride feature (step 401). As shown in FIG. 4, after a driver response is memorized (step 221) and performed (step 223), if the driver then alters their response under the same conditions (step 403) the controller 101 deletes the memorized response and returns the system to the default response for that driver under those conditions (step 405). If the driver does not alter their response (step 407), then their inaction is taken as an implicit approval of the modified response memorized in step 221.

Figure 5:
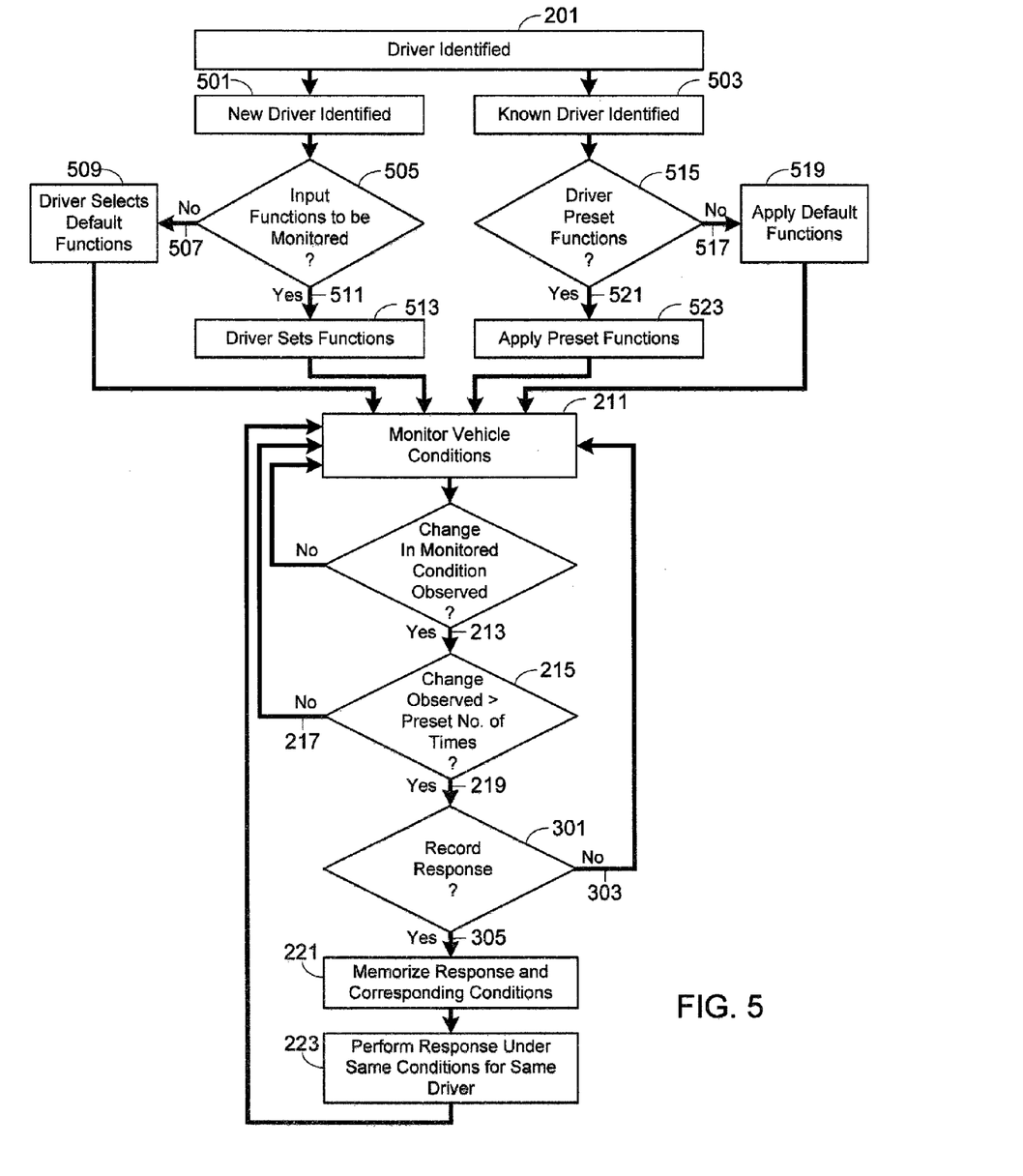
FIG. 5 illustrates another modification of the basic methodology shown in FIG. 2.

FIG. 5 illustrates another modification of the basic methodology shown in FIG. 2 that allows a driver to preset the vehicle functions to be monitored in step 211 and potentially altered and recorded in step 221. Although this aspect of the invention is illustrated using the basic methodology of FIG. 2, it should be understood that any of the embodiments of the invention may be modified to allow drivers to select the functions which they wish to be monitored and potentially altered.

It will be appreciated that there are several ways in which the driver can be allowed to preset the functions to be monitored. For example, when a driver is first identified (step 201) using any of the techniques described above (e.g., relative to steps 203-209), system controller 101 determines whether the identified driver is a first time user of the vehicle (step 501) or a driver that has been previously identified by the system (step 503). If the driver is new (step 501), then the system controller requests via interface 105 that the new driver input initial system settings (step 505). At a minimum, the initial system settings include a selection of which vehicle functions the driver wants the system to monitor in order to potentially learn that particular driver's responses to specific conditions. The driver may also be asked to input the number of times that a behavior must be repeated in step 215 before it is to be learned. As described in further detail below, typical vehicle functions from which the driver may select include the entertainment system, HVAC, lights, drive mode, seat and steering wheel settings, mirror settings, charging system (for an EV), as well as various vehicle auxiliary controls (e.g., garage door opener). The driver may choose not to preselect the functions to be monitored (step 507), and instead simply use the vehicle's default settings (step 509). The new driver may also choose to preselect the functions to be monitored (step 511), at which point the driver would be presented with those functions that the vehicle is capable of monitoring. The driver would then select those functions of interest (step 513).

As it would be both time consuming and somewhat annoying if the controller asked every driver to input initial system settings each time they wanted to drive the car, preferably the controller distinguishes between those drivers that are new to the system (step 501) and those drivers that have been previously identified by the controller (step 503). For those drivers that are known by the system (step 503), the controller determines whether or not the identified driver had previously preselected the functions to be monitored (step 515). If the identified driver had not previously preselected the functions to be monitored (step 517), the system applies the vehicle's default settings (step 519). If the identified driver had previously preselected the functions to be monitored (step 521), then the controller applies the driver's presets (step 523). In step 211, the controller monitors the vehicle functions, either the default functions or those selected by the driver, for changes (step 211).

While the methodology applied by the invention has been described above relative to FIGS. 2-5, some specific examples are provided below, thus helping to illustrate the application of the invention to known vehicle functions. It should be understood that these exemplary applications of the invention may utilize any of the approaches described above. Further, these exemplary applications are only meant to illustrate the invention, not limit its application to these specific vehicle functions.

Drivers often alter various vehicle settings, either when they first enter the car or while driving, in order to vary the car to match their physical characteristics, their driving style and/or their environmental preferences. Accordingly, in at least one embodiment of the invention system controller 101 monitors various vehicle functions that the driver may use to enhance the fit of the car to their own physical characteristics, such as seat position (e.g., seat position, seat height, seatback incline, lumbar support, seat cushion angle and seat cushion length) using seat controller 115 and steering wheel position using an auxiliary vehicle system controller 117. Preferably, the system controller 101 also monitors a driving mode selector 119 which is used to control performance characteristics of the vehicle (e.g., economy, sport, normal). System controller 101 may also monitor suspension characteristics using an auxiliary vehicle system 117, assuming that the suspension is user adjustable. Preferably, system controller 101 also monitors those aspects of the vehicle which are often varied by the user in order to match his or her environmental preferences, for example setting the thermostat temperature or the recirculation controls of the HVAC system using HVAC controller 121, and/or setting the radio station/volume level of the audio system using controller 123, and/or setting the lights, either internal lighting or external lighting, using controller 131. Assuming that an identified driver makes the same adjustments to one or more of the systems monitored in step 211 more than once (and more than the preset number used in step 215), and within a preset period of time upon activating the car (as determined by internal clock 125), then the controller would record those settings in memory (step 221) and apply them immediately when the same driver was identified (step 223).

As previously described, in order to learn a behavior the system controller must identify a particular driver and determine that the identified driver performs the same behavior more than a preset number of times in response to a certain condition (e.g., a specific time of day, vehicle location, or event). In some embodiments the behavior must be consistently repeated each time a certain event occurs, while in other embodiments the behavior must simply be repeated with a certain frequency, i.e., more often than not. In some cases the event to which the monitored behavior corresponds is a timing event, such as making a variety of vehicle adjustments upon entering the car (i.e., within a preset period of time of vehicle entry). It will be appreciated that other timing events may be used by controller 101. For example, during their morning commute a particular driver may tune the radio, via controller 123, to a particular station at 8:00 AM in order to listen to a particular program (e.g., news broadcast, traffic alerts, financial news, etc.). In accordance with the invention, controller 101 may be used to learn that particular driver's radio listening schedule and then when that driver is identified, to automatically tune to that particular station at the same time each day (e.g., at 8:00 AM), or at the same time of day and on the same days of the week (e.g., at 8:00 AM on Monday-Friday, but not Saturday or Sunday).

Preferably when the controller is learning a particular driver behavior and determining whether or not a particular driver is repeating that behavior at a particular time of day, of at a particular time of day and for a particular day of the week, the controller monitors for behavior within a preset time period that is inclusive of the time of day in which the behavior was observed, rather than monitoring for the same behavior at the exact same time each day. The system may be configured to allow the length of the preset time period to be set by the vehicle manufacturer, the driver, or a third party. Thus in the above example, and assuming that the preset time period is set to 4 minutes (e.g., 2 minutes before the observed event and 2 minutes after the observed event), then in order to determine if the driver is performing the same behavior on multiple days (or specific days of the week), the controller would monitor for the driver making the same change to the radio station at any time between 7:58 AM and 8:02 AM, viewing performance of the same behavior within this time window as being equivalent. Additionally, and as noted above, besides monitoring for behavior at a particular time of day, the system may be configured to distinguish between weekdays and weekends, or to distinguish between the days of the week, thus allowing controller 101 to learn alternate behaviors for different days of the week or weekdays versus weekends.

In addition to learning driver behavior that relates to a specific time of day, controller may also learn repetitive behavior that occurs each time that the vehicle is at, or within a preset distance of, a particular coordinate as determined by controller 101 using global positioning system (GPS) 129. For example, each time the vehicle is at or near a coordinate that corresponds to the driver's home, the driver may open the garage using an auxiliary system controller 117. By learning this behavior, controller can automatically program itself to open the garage door when the car arrives at home. Similarly, assuming that the vehicle is an EV, the car may always charge the battery at the same two locations, one corresponding to the driver's home location and the other corresponding to the driver's work location. Controller may learn that each time that the driver reaches one of these two locations the door that covers the charging port is opened. Controller can learn this behavior and always open the charge port door when the driver arrives at home or at work. The vehicle's lights 131 offer another example of a function that may be learned based on location. For example, the driver may always turn on their driving lights when they pass through a tunnel. By noting this behavior, i.e., temporarily turning on the lights while driving between a first location and a second location, controller 101 can learn this behavior and automatically turn on the lights whenever the identified driver passes through that same tunnel.

In addition to learning driver behavior that relates to a specific time of day or a specific location, controller 101 may also learn repetitive behavior that occurs in response to a particular event or condition. For example, controller 101 may monitor exterior temperature using an ambient environmental sensor 133. If the driver always lowers the internal temperature to 65° F. when the external temperature is 95° F., then the controller can learn this behavior and always lower the to 65° F. when the external temperature is 95° F. and the identified driver is driving. Similarly, controller may monitor exterior light levels in order to observe when a particular driver turns on or off their lights; or monitor exterior sound levels in order to observe when a particular driver increases the volume level on the audio system in order to mask the ambient sound level. Besides using on-board sensors, controller 101 may also use data received from an external on-line source that is coupled to the controller via communication link 109 (using, for example, GSM, EDGE, UMTS, CDMA, DECT, WiFi, WiMax, etc.). For example, by monitoring air quality (e.g., smog, smoke pollution, pollen count) using an on-line weather service 135 or an on-line data base 137, controller 101 can correlate the user turning on air recirculation with an external event (e.g., high pollen count, low air quality, etc.), and thereafter repeat the learned behavior whenever the same air quality issue is detected.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of automatically modifying a system setting for a vehicle utilizing an on-board system controller, said on-board system controller comprising a central processing unit (CPU) and a memory, the method comprising the steps of:

identifying a specific driver of said vehicle from a plurality of potential drivers, wherein said on-board system controller performs said identifying step;

monitoring a plurality of user-settable functions corresponding to a plurality of vehicle systems, wherein said on-board system controller is configured to monitor said plurality of vehicle systems and said plurality of user-settable functions, wherein said plurality of vehicle systems are selected from the group consisting of a vehicle audio system, a vehicle heating, ventilation and air conditioning (HVAC) system, a vehicle mode selector system, a vehicle seat positioning system, a vehicle steering wheel positioning system, an internal lighting system, an external lighting system, a vehicle suspension system, a vehicle navigation system, a garage door controller, a charge port door controller, and a fuel door controller;

monitoring an ambient environment of said vehicle, wherein said on-board system controller performs said step of monitoring said ambient environment;

detecting an occurrence of said specific driver adjusting a specific function of said plurality of user-settable functions to a first setting, wherein said on-board system controller performs said detecting step; and determining an environmental condition corresponding to said ambient environment coincident with said occurrence of said specific driver adjusting said specific function of said plurality of user-settable functions to said first setting, wherein if said specific driver adjusts said specific function of said plurality of user-settable functions to said first setting each time said environmental condition re-occurs for more than a preset number of times then the method further comprises the step of:

automatically modifying said specific function of said plurality of user-settable functions to said first setting each time said on-board system controller identifies said specific driver and said environmental condition re-occurs, wherein said step of automatically modifying said specific function of said plurality of user-settable functions is performed by said on-board system controller.

2. The method of claim 1, wherein said specific driver must adjust said specific function of said plurality of user-settable functions to said first setting each time said specific driver is identified by said on-board system controller and said environmental condition re-occurs, wherein if said specific driver does not consistently adjust said specific function of said plurality of user-settable functions to said first setting each time said environmental condition re-occurs then said method at least temporarily suspends said step of automatically modifying said specific function of said plurality of user-settable functions.

3. The method of claim 1, wherein said steps of identifying said specific driver, monitoring said plurality of user-settable functions, monitoring said ambient environment, detecting said occurrence and determining said environmental condition are performed over a period of days.

4. The method of claim 1, further comprising the step of requesting driver confirmation prior to performing said step of automatically modifying said specific function of said plurality of user-settable functions to said first setting each time said specific driver is identified and said environmental condition re-occurs, wherein said on-board system controller performs said step of requesting driver confirmation.

5. The method of claim 4, wherein if a positive response is not received to said step of requesting driver confirmation, said method does not perform said step of automatically modifying said specific function of said plurality of user-settable functions to said first setting each time said specific driver is identified and said environmental condition re-occurs.

6. The method of claim 1, wherein said step of automatically modifying said specific function of said plurality of user-settable functions to said first setting further comprises the steps of:
   recording in said memory said first setting and said environmental condition; and
   associating said first setting and said environmental condition with said specific driver.

7. The method of claim 6, further comprising the step of requesting driver confirmation prior to performing said steps of recording in said memory said first setting and said environmental condition, associating said first setting and said environmental condition with said specific driver, and automatically modifying said specific function of said plurality of user-settable functions to said first setting each time said specific driver is identified and said environmental condition re-occurs, wherein said on-board system controller performs said step of requesting driver confirmation.

8. The method of claim 7, wherein if a positive response is not received to said step of requesting driver confirmation, said method does not perform said steps of recording in said memory said first setting and said environmental condition, associating said first setting and said environmental condition with said specific driver, and automatically modifying said specific function of said plurality of user-settable functions to said first setting each time said specific driver is identified and said environmental condition re-occurs.

9. The method of claim 1, wherein if after said step of automatically modifying said specific function of said plurality of user-settable functions to said first setting said specific driver adjusts said specific function of said plurality of user-settable functions from said first setting to a second setting during said environmental condition then said method further comprises the step of at least temporarily suspending said step of automatically modifying said specific function of said plurality of user-settable functions to said first setting.

10. The method of claim 9, wherein said suspending step is performed until said specific driver repeats said step of adjusting said specific function of said plurality of user-settable functions to said first setting when said environmental condition re-occurs and for more than said preset number of times.

11. The method of claim 1, wherein if said specific driver adjusts said specific function of said plurality of user-settable functions from said first setting to an alternate setting within a preset length of time of said step of automatically modifying said specific function of said plurality of user-settable functions to said first setting then said method further comprises the step of at least temporarily suspending said step of automatically modifying said specific function of said plurality of user-settable functions to said first setting.

12. The method of claim 11, wherein said suspending step is performed until said specific driver repeats said step of adjusting said specific function of said plurality of user-settable functions to said first setting when said environmental condition re-occurs and for more than said preset number of times.

13. The method of claim 1, wherein said step of identifying said specific driver of said vehicle step is performed when a remote device is plugged into an on-board port coupled to said on-board system controller, wherein said remote device is physically separate and independent of said vehicle.

14. The method of claim 1, said step of identifying said specific driver of said vehicle step further comprising the steps of:
   detecting a user device when said user device is within a preset range of said vehicle, wherein said on-board system controller performs said step of detecting said user device; and
   establishing a short range link between said user device and said on-board system controller after said user device is detected, wherein said step of identifying said specific driver is performed automatically by said on-board system controller when said short range link is established between said user device and said on-board system controller, wherein said user device is physically separate and independent of said vehicle.

15. The method of claim 1, wherein said step of identifying said specific driver of said vehicle step is performed using an on-board driver identification system coupled to said on-board system controller.

16. The method of claim 15, wherein said on-board driver identification system is selected from the group consisting of a fingerprint scanner, a face recognition system, a voice recognition system, a weight-based identification system, a voice-controlled user interface, and a touch-controlled user interface.

17. The method of claim 1, wherein said environmental condition corresponds to at least one of a specific ambient temperature, a specific ambient air quality, a specific ambient sound level, or a specific ambient light level.

* * * * *